United States Patent
Caldwell et al.

(10) Patent No.: US 6,782,620 B2
(45) Date of Patent: Aug. 31, 2004

(54) METHODS FOR REPLACING A PORTION OF A COMBUSTOR DOME ASSEMBLY

(75) Inventors: James M. Caldwell, Alexandria, KY (US); Edward J. Emilianowicz, West Chester, OH (US); Gary Scott Loveless, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/352,823

(22) Filed: Jan. 28, 2003

(65) Prior Publication Data

US 2004/0143967 A1 Jul. 29, 2004

(51) Int. Cl.⁷ ................................................. B23P 15/00
(52) U.S. Cl. .................... 29/890.01; 29/888; 29/402.11; 29/402.13
(58) Field of Search .............................. 29/890.01, 888, 29/889.1, 889.2, 402.03, 402.11, 402.13, 402.16; 60/748, 740, 752

(56) References Cited

U.S. PATENT DOCUMENTS

| | | |
|---|---|---|
| 4,485,630 A | 12/1984 | Kenworthy |
| 4,773,227 A | 9/1988 | Chabis |
| 4,912,922 A | 4/1990 | Maclin |
| 5,117,637 A * | 6/1992 | Howell et al. ................. 60/748 |
| 5,142,871 A | 9/1992 | Lampes et al. |
| 5,154,060 A | 10/1992 | Walker et al. |
| 5,181,379 A | 1/1993 | Wakeman et al. |
| 5,241,827 A | 9/1993 | Lampes |
| 5,261,223 A | 11/1993 | Foltz |
| 5,279,127 A | 1/1994 | Napoli |
| 5,307,637 A | 5/1994 | Stickles et al. |
| 5,323,604 A | 6/1994 | Ekstedt et al. |
| 5,329,761 A | 7/1994 | Ablett et al. |
| 5,375,420 A * | 12/1994 | Falls et al. .................... 60/747 |
| 5,430,935 A | 7/1995 | Yaworsky et al. |
| 5,826,431 A | 10/1998 | Makino et al. |
| 5,839,643 A | 11/1998 | Inoue et al. |
| 6,049,978 A | 4/2000 | Arnold |
| 6,079,199 A | 6/2000 | McCaldon et al. |
| 6,141,862 A | 11/2000 | Matsui et al. |
| 6,163,959 A | 12/2000 | Arraitz et al. |
| 6,286,317 B1 | 9/2001 | Burrus et al. |
| 6,345,441 B1 | 2/2002 | Farmer et al. |
| 6,434,821 B1 | 8/2002 | Nelson et al. |
| 6,442,940 B1 * | 9/2002 | Young et al. ................. 60/748 |
| 6,456,732 B1 * | 9/2002 | Kimbell et al. ............. 382/112 |
| 6,474,070 B1 * | 11/2002 | Danis et al. .................. 60/739 |

* cited by examiner

*Primary Examiner*—I Cuda Rosenbaum
(74) *Attorney, Agent, or Firm*—William Scott Andes; Armstrong Teasdale LLP; Robert B. Resser, III

(57) ABSTRACT

A method enables a portion of combustor dome assembly to be replaced. The dome assembly includes at least one dome cup including at least one swirl cup including a joint that defines a slot therein, and a deflector plate assembly that is coupled to, and extends downstream from, the swirl cup, such that a portion of the deflector plate assembly is securely fixed within the joint slot. The method comprises cutting through an interface formed between the deflector plate assembly and the joint slot, extending the cut substantially between the deflector assembly and the joint slot through the at least one dome cup, removing the deflector plate assembly from the combustor dome assembly, and coupling a replacement deflector plate assembly within the combustor dome assembly that extends aft from the portion of the combustor dome assembly that is upstream from the cut.

18 Claims, 3 Drawing Sheets

METHODS FOR REPLACING A PORTION OF A COMBUSTOR DOME ASSEMBLY

BACKGROUND OF THE INVENTION

This invention relates generally to gas turbine engines, and more particularly, to methods for replacing a portion of a combustor dome assembly.

A turbine engine includes a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber.

At least some known dome assemblies include a structural member (herein referred to as a dome plate) with a fuel and air swirl chamber that extends forward, or upstream, from the dome plate, and a thermal protection feature, (herein referred to as a deflector plate) that extends aftward, or downstream. The number of swirl chambers and deflector plates is variably selected depending upon the gas turbine engine application. The flame in a gas turbine is typically generated just downstream of the dome, where the fuel and air mixture is sufficient to maintain the combustion process. At least some known dome assemblies include multiple components that through a complex shape facilitate containing the flame released by the fuel-air mixture. Such components may, for example, consist of a single unit, or may be manufactured separately and assembled together to facilitate improved maintainability and repairability. More specifically, at least some known dome assemblies include deflector plates coupled to a downstream side of the dome plate to shield the structural dome plate from high temperatures generated within the combustor. Typically, the deflector plates are coupled within the dome assembly using either a welding process or a brazing process.

Over time, continued exposure to high temperatures may induce oxidation erosion or thermal fatigue cracking damage to the deflector plates. To facilitate effective shielding of the dome plate, damaged deflector plates may require replacement. At least some known repair methods include conventional machining the dome assembly to remove the damaged deflector plates. However, because of the relatively close location of the swirl chamber attachment feature, conventional machining techniques may not be possible without damaging or removing the swirl chamber. Furthermore, if the machining is successful, often times precise dimensional relations between the remaining combustor dome assembly components may be altered and as a result, special tooling may be required during reassembly. Thus, replacing a portion of a combustor dome assembly may be a time-consuming and expensive process.

BRIEF SUMMARY OF THE INVENTION

In one aspect, a method for replacing a portion of combustor dome assembly is provided. The dome assembly includes at least one deflector plate and a dome cup including a swirl cup including an interface feature that defines a slot therein for locating a deflector plate. The deflector plate extends downstream from the dome plate and swirl cup such that a portion of the deflector plate is securely fixed within the interface feature. The method comprises cutting through an interface formed between the deflector assembly and the swirl cup slot, extending the cut substantially circumferentially between the deflector plate and the swirl cup slot through the at least one swirl cup, removing the deflector assembly from the combustor dome assembly, and coupling a replacement deflector plate from the existing swirl cup within the combustor dome assembly that extends aft from the portion of the combustor dome assembly that is upstream from the cut.

In another aspect of the invention, a method for replacing a portion of a combustor dome assembly within a gas turbine engine combustor is provided. The dome assembly is at an upstream end of a combustion chamber defined within the combustor, and includes at least one swirl cup including an interface feature and at least one deflector plate that extends aftward from the interface feature. The at least one deflector plate is coupled to the at least one swirl cup with at least one of a braze process and a weld process. The method comprises forming a substantially annular cut through the interface features formed by at least one of weld material and braze material, removing the deflector plate from the combustor, and coupling a replacement deflector plate into the combustor to extend downstream from the interface feature.

In a further aspect, a method for replacing a portion of a gas turbine engine combustor dome assembly is provided. The method comprises using an electro-discharge machining process to cut through an interface formed between a swirl cup and a deflector plate coupled therein, removing the deflector plate from the combustor, and coupling a replacement deflector plate into the existing swirler interface feature.

DETAILED DESCRIPTION OF THE INVENTION

Figure 1:
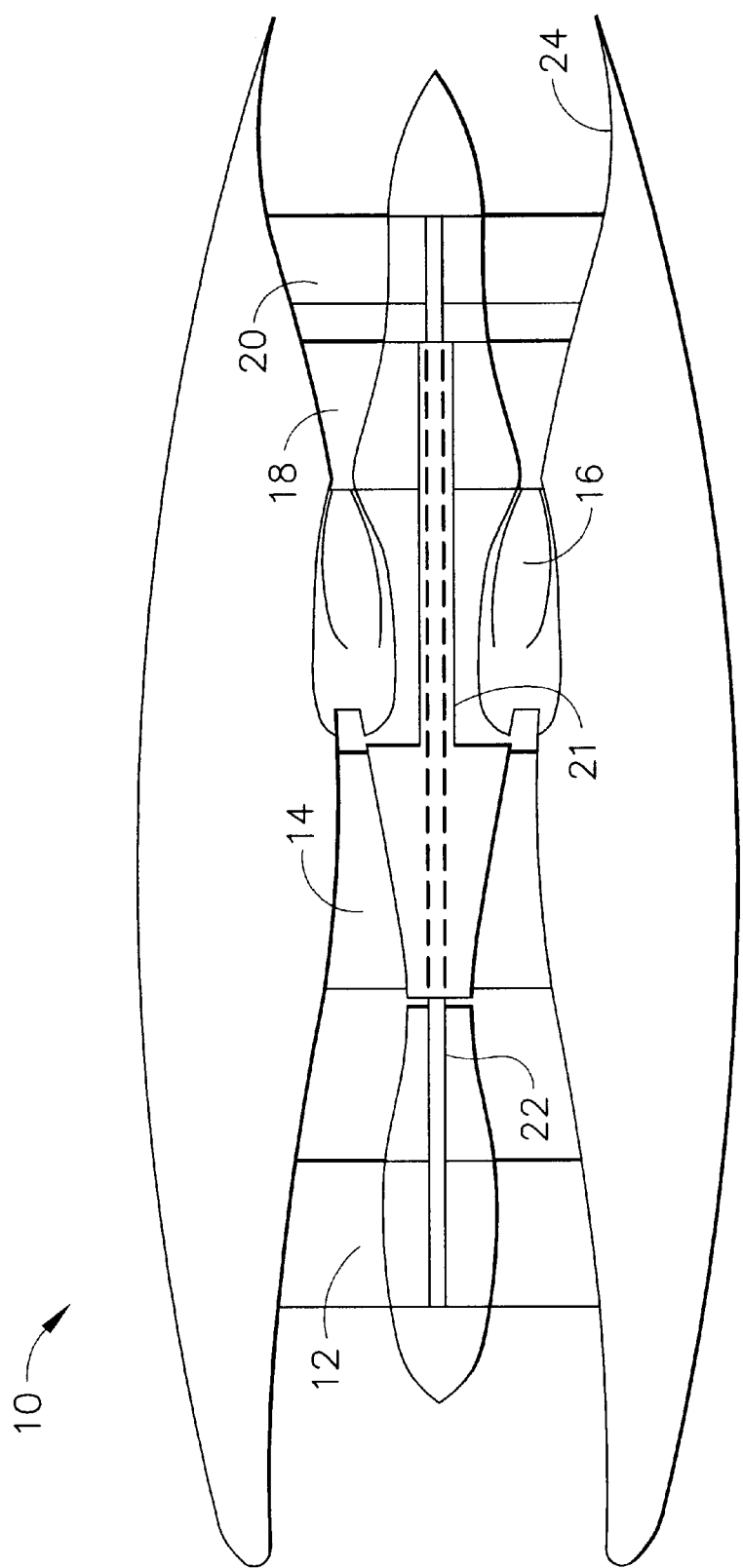
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CF6 engine commercially available from General Electric Aircraft Engines, Cincinnati, Ohio.

In operation, air flows through low pressure compressor 12 and compressed air is supplied from low pressure compressor 12 to high pressure compressor 14. The highly compressed air and fuel is delivered to combustor 16, wherein the fuel-air mixture is ignited. High pressure and high temperature air from combustor 16 drives turbines 18 and 20 and exits gas turbine engine 10 through a nozzle 24 to produce thrust.

Figure 2:
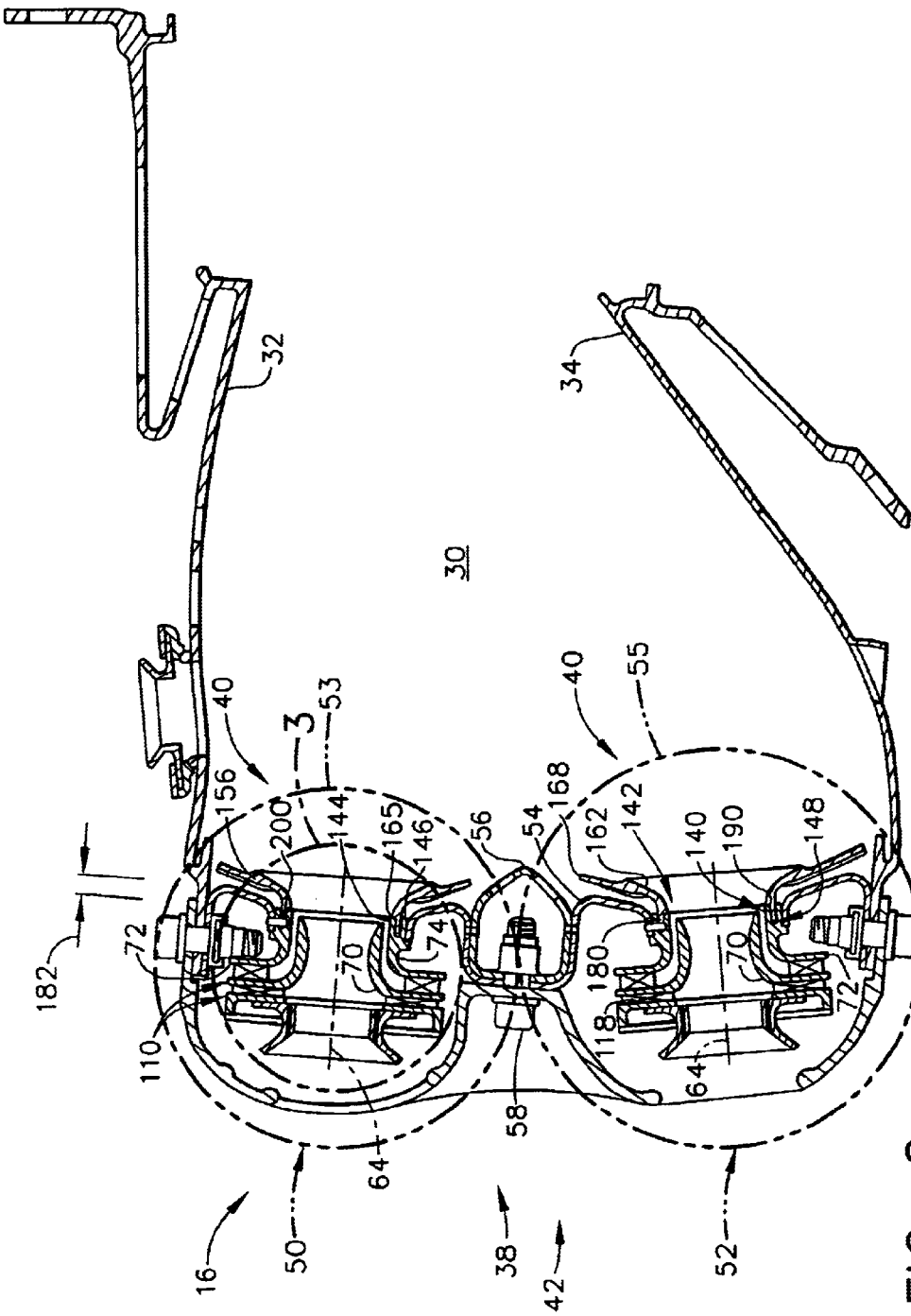
FIG. 2 is a partial cross-sectional view of an exemplary combustor assembly that may be used with the gas turbine engine shown in FIG. 1.
Figure 3:
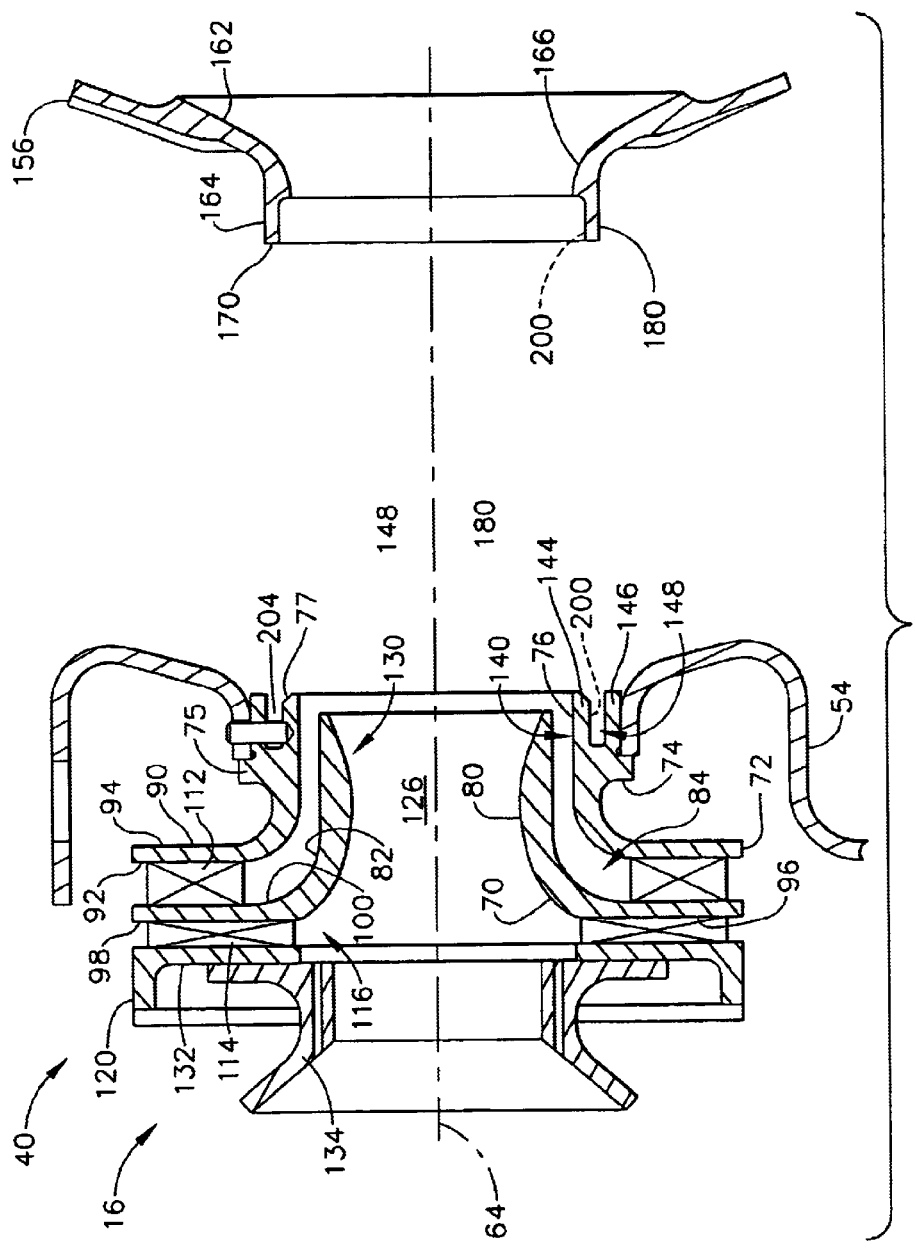
FIG. 3 is an enlarged view of a portion of the combustor shown in FIG. 2 taken along area 3 and shown partially disassembled.

FIG. 2 is a cross-sectional view of an exemplary combustor 16 for use with a gas turbine engine, similar to engine 10 shown in FIG. 1, and FIG. 3 is an enlarged partial view of combustor 16 taken along area 3 and partially disassembled. Combustor 16 includes a combustion zone or chamber 30 defined by annular, radially outer and radially inner liners 32 and 34. More specifically, outer liner 32 defines an outer boundary of combustion chamber 30, and inner liner 34 defines an inner boundary of combustion chamber 30. Liners 32 and 34 are radially inward from an annular combustion chamber casing (not shown), which extends circumferentially around liners 32 and 34.

Combustor 16 also includes a dome assembly 38 including a plurality of annular domes 40 mounted upstream from outer and inner liners 32 and 34, respectively. Domes 40 define an upstream end 42 of combustion chamber 30 and swirl cups 64 are spaced circumferentially around domes 40 to deliver a mixture of fuel and air to combustion chamber 30. Swirl cups 64 each include a floating ferrule 134 located at a forward side of a cap plate 132, which contains forward, or primary swirl vanes 114, a mid flange 70, aft or secondary vanes 112, and an end plate 94. Mid flange 70 defines separation passages between a primary airflow circuit 116 and a secondary airflow circuit defined by a swirler channel 84, and forms a venturi that facilitates metering of air and fuel flow therethrough. End plate 94 extends aftward towards dome plate 54 and provides an extension feature 75 that enables coupling to dome plate 54, and a feature 77 for attachment to a deflector plate extension 170. Because combustor 16 includes two annular domes 40, combustor 16 is known as a dual annular combustor (DAC). Alternatively, combustor 16 may be a single annular combustor (SAC) or a triple annular combustor.

More specifically, in the exemplary embodiment, domes 40 include a plurality of radially outer dome cups 50 and a plurality of radially inner dome cups 52 that are coupled together by a dome assembly dome plate 54 that extends between dome cups 50 and 52. Dome cups 50 extend circumferentially through an outer ring assembly 53, and dome cups 52 extend circumferentially through an inner ring assembly 55. Dome plate 54 provides structural support to combustor 16 and includes a centershield 56 that is coupled to dome plate 54 by a fastener 58 that extends through dome plate 54.

Each dome 40 has a center longitudinal axis of symmetry 66 that extends therethrough. Each dome 40 also includes an end plate 72 that is positioned symmetrically about longitudinal axis of symmetry 66. End plate 72 includes a radially outer surface 74 and a radially inwardly facing flow surface 76. Mid flange 70 includes a radially outer surface 80 and a radially inwardly facing flow surface 82. End plate flow surface 76 and air swirler flow surface 82 define swirler channel 84 which is used for channeling a portion of air downstream therethrough.

More specifically, end plate 72 includes an integrally-formed outwardly extending radial flange portion 90. End plate flange portion 90 includes an upstream surface 92 that extends from flow surface 76, and a substantially parallel downstream surface 95 that is generally perpendicular to flow surface 76. Mid flange 70 includes an integrally-formed outwardly-extending radial flange portion 96 that includes an upstream surface 98 and a substantially parallel downstream surface 100 that extends from air swirler flow surface 82. Air swirler flange surfaces 98 and 100 are substantially parallel to exit cone flange surfaces 92 and 95, and are substantially perpendicular to air swirler flow surface 82.

Dome 40 also includes a plurality of circumferentially spaced swirl vanes 112 and 114. More specifically, a plurality of aft swirl vanes 112 are slidably coupled to end plate flange portion 90 within swirler channel 84. A plurality of forward swirl vanes 114 are slidably coupled to air swirler flange portion 96 within a forward air swirl channel 116. Forward air swirl channel 116 is defined between mid flange portion 96 and a downstream side 118 of a forward support plate 120. Forward air swirl channel 116 is substantially parallel to aft venturi channel 84 and extends radially inward towards center longitudinal axis of symmetry 66.

Air swirler flange portion surfaces 98 and 100 are substantially planar and air swirler flow surface 82 is substantially convex and defines a venturi passage 126. Venturi passage 126 has a throat surface 130 which defines a minimum flow area.

Forward support plate 120 is concentrically aligned with respect to combustor center longitudinal axis of symmetry 66, and includes an upstream surface coupled to a tubular ferrule 134. A fuel injector (not shown) may be slidably coupled within ferrule 134 to accommodate axial and radial thermal differential movement.

A joint or interface feature 140 is integrally formed within end plate 72 at an aft end 142 of end plate 72. More specifically, joint 140 includes a radially inner arm 144, a radially outer arm 146, and an attachment slot 148 that is defined therebetween. Radially inner arm 144 extends between end plate flow surface 76 and slot 148. Radially outer arm 146 is substantially parallel to inner arm 144 and extends between slot 148 and end plate downstream surface 95. Slot 148 is contoured and is substantially parallel to flow surface 76.

A plurality of deflector plate assemblies 156 couple to dome 40 such that deflector plate assembly 156 is coupled to end plate 72 and extends downstream from end plate 72. More specifically, deflector plate assembly 156 includes a radially inner flow conical surface 162 and a radially outer surface 164. When deflector plate assembly 156 is coupled to end plate 72, radially inner flow conical surface 162 is substantially co-planar with end plate Now surface 76. More specifically, deflector plate inner flow surface 162 is convergent and extends to a radius 166. Deflector plate inner flow surface 162 extends radially outwardly from radius 166 to an outer edge 168 of deflector plate assembly 156. In the exemplary embodiment, deflector plate assemblies 156 are fabricated from an enhanced oxidation resistant material that is investment cast to a complex contoured shape.

Deflector plate outer surface 164 is substantially parallel to flare cone inner surface 162 between a leading edge of deflector plate assembly 156 and radius 166. Outer surface 164 is substantially cylindrical and extends forward from radius 166. A substantially cylindrical projection 180 extends a distance 182 axially upstream from stop surface 165. Projection 180 is sized to be received within slot 148 and fixedly coupled therein. More specifically, attachment projection 180 is extended into end plate slot 148, such that end plate aft end 142 contacts stop surface 165. In one embodiment, projection 180 is fixedly secured within slot 148 using a weld process, such that weld material (not shown) extends through an interface 190 defined between projection 180 and slot 148. In another embodiment, attachment projection 180 is fixedly secured within slot 148 using a braze process, such that braze material (not shown) is deposited through interface 190.

During operation, as atomized fuel is injecting into combustion zone 30 and ignited, heat is generated within zone 30. Deflector plate assemblies 156 facilities shielding dome assembly 38 from heat generated within zone 30. However, over time, continued exposure to high temperatures may induce thermal stresses to a plurality of deflector plate assemblies 156 which may damage and/or dimensionally distort deflector plate assemblies 156.

Deteriorated or damaged portions of dome assembly 38 may be removed and replaced using the methods described herein. More specifically, deteriorated deflector plate assemblies 156 may be removed and replaced using the methods described herein. If a deflector plate assembly 156 is desired to be replaced, a cut, illustrated as 200 in FIGS. 2 and 3 is made through a portion of deflector plate joint slot interface 190. More specifically, cut 200 is made through attachment interface 190 and through the weld material and/or braze material that is deposited within attachment interface 190. Cut 200 is then extended substantially circumferentially around a respective desired dome cup 50 or 52 through attachment interface 190. In one embodiment, a series of cuts 200 is formed circumferentially around dome cup 50 and 52 through attachment interface 190. More specifically, cut 200 is formed using an electro-discharge machining (EDM) process.

After cut 200 is extended substantially circumferentially, deflector plate assembly 156 is removable from combustor dome assembly 38. Specifically, as deteriorated deflector plate assembly 156 is removed from dome assembly 38, a substantially identical, or improved, replacement deflector plate assembly (not shown) may be coupled to dome assembly 38. More specifically, as an EDM electrode (not shown) forms cut 200, a channel 204 is simultaneously formed within joint 140 between arms 144 and 146. Channel 204 is contoured to substantially match a contour of an attachment projection (not shown) extending from the replacement deflector plate assembly. Accordingly, channel 204 is contoured to substantially match an original contour of joint attachment slot 148, such that channel 204 is sized and oriented to receive a replacement deflector attachment projection therein. In addition, any additional or excess weld material and/or braze material may be removed from channel 204 after deflector plate assembly 156 is removed.

More specifically, after the replacement deflector plate assembly is positioned within channel 204, the replacement deflector plate assembly is securely coupled in position using either a welding process or a brazing process, such that dome assembly 38 is returned to substantially the original predefined dimensional requirements. In one embodiment, the replacement deflector plate assembly can include, but is not limited to including, at least one of cooling upgrades or material upgrades to facilitate extending a useful life of combustor 16.

Because deteriorated deflector plate assemblies 156 are replaced using the method described herein, combustors 16 are returned to service using a replacement process that facilitates improved savings in comparison to removing and replacing entire dome assemblies 38. In addition, because the deteriorated deflector plate assemblies are removed using an EDM process, additional clearances that are required using at other known machining processes are not required. Accordingly, the EDM process facilitates removal of the deteriorated deflector plate assembly while simultaneously preparing the combustor dome assembly joint to receive a replacement deflector plate assembly. Furthermore, because the replacement deflector plates are formed to be substantially identical to originally installed deflector plates 156, aerodynamic performance and combustor performance are not adversely impacted by the replacement deflector plates. As such, the EDM process and methods of repair described herein facilitated enhanced repeatability of removal and installation of deflector plate assemblies.

Exemplary embodiments of combustor deflector plate replacement are described above in detail. Although the repair methods are herein described and illustrated in association with the above-described dome assembly for a gas turbine engine, it should be understood that the present invention may be used with any combustion chamber configuration that includes cast complex shape deflector plates and complex swirler attachment features. More specifically, the methods are not limited to the specific embodiments described herein, but rather, aspects of each method may be utilized independently and separately from other methods described herein.

The above-described method for replacing a portion of a combustor dome assembly used with a gas turbine engine is cost-effective and reliable. The repair methods enable a deflector plate assembly having a complex shape to be removed from an existing dome assembly without generating additional damage to other combustor dome assembly components during the process. More specifically, the repair methods facilitate removing deteriorated deflector plate assemblies from the combustor dome assembly while simultaneously preparing the combustor liners to receive a replacement component dome. As a result, a method is provided which enables deteriorated portions of combustor dome assemblies to be removed and replaced in a cost-effective and reliable manner.

While the invention has been described in terms of various specific embodiments, those skilled in the art will recognize that the invention can be practiced with modification within the spirit and scope of the claims.

What is claimed is:

1. A method for replacing a portion of combustor dome assembly, the dome assembly including at least one dome swirl cup including a joint that defines a slot therein, and an annular deflector plate assembly coupled to, and extending downstream from, the swirl cup such that a portion of the deflector plate assembly is securely fixed within the joint slot, said method comprising:

cutting through an interface formed between the deflector plate assembly and the joint slot;

extending the cut substantially between the deflector plate assembly and the joint slot through the at least one dome cup;

removing the deflector plate assembly from the combustor dome assembly; and coupling a replacement deflector plate assembly within the combustor dome assembly that extends aft from the portion of the combustor dome assembly that is upstream from the cut.

2. A method in accordance with claim 1 wherein cutting through an interface further comprises using an electro-discharge machining process to cut through the interface formed between the deflector plate assembly and the joint slot.

3. A method in accordance with claim 1 wherein cutting through an interface formed further comprises forming a contoured channel within the joint.

4. A method in accordance with claim 3 wherein forming a contoured channel further comprises forming a channel that has a contour that substantially matches a contour of a portion of the replacement deflector assembly.

5. A method in accordance with claim 1 wherein extending the cut substantially between the deflector plate assembly and the joint slot through the at least one swirl cup further comprises forming a series of cuts that are spaced through the at least one swirl cup.

6. A method in accordance with claim 1 wherein removing the deflector plate assembly from the combustor dome assembly further comprises removing excess material from the channel using an electro-discharge machining process.

7. A method in accordance with claim 1 wherein coupling a replacement deflector plate assembly within the combustor dome assembly further comprises using at least one of a brazing process and a welding process to couple the replacement deflector plate assembly within the combustor.

8. A method for replacing a portion of a combustor dome assembly within a gas turbine engine combustor, the dome assembly at an upstream end of a combustion chamber defined within the combustor, the dome assembly including at least one swirl cup including a joint and at least one deflector plate extending aftward from the joint, the at least one deflector plate coupled to the at least one swirl cup with at least one of a brazing process and a welding process, said method comprising:

forming a cut that extends substantially through at least one of weld material and braze material formed at an interface between the swirl cup joint and the deflector plate;

removing the deflector plate from the combustor dome assembly; and coupling a replacement defector plate to the combustor dome assembly to extend downstream from the joint.

9. A method in accordance with claim 8 wherein forming a cut further comprises using an electro-discharge machining process to cut through the interface formed between the deflector plate assembly and the swirl cup.

10. A method in accordance with claim 8 wherein forming a cut further comprises forming a channel within the joint.

11. A method in accordance with claim 10 wherein forming a channel within the joint further comprises forming a channel sized to receive the replacement deflector plate therein.

12. A method in accordance with claim 10 wherein forming a channel within the joint further comprises contouring the channel to receive the replacement deflector plate therein.

13. A method in accordance with claim 10 wherein coupling a replacement deflector plate into the combustor dome assembly to extend downstream from the joint further comprises using at least one of a brazing process and a welding process to couple the replacement deflector plate assembly within the combustor.

14. A method for replacing a portion of a gas turbine engine combustor dome assembly, said method comprising:

using an electro-discharge machining process to cut through an interface formed between a swirl cup end plate joint and a deflector plate assembly coupled therein;

removing the deflector plate assembly from the combustor; and coupling a replacement deflector plate into the cup joint.

15. A method in accordance with claim 14 wherein using an electro-discharge machining process further comprises forming a cut that extends substantially between the swirl cup end plate joint and the deflector plate assembly.

16. A method in accordance with claim 14 wherein using an electro-discharge machining process further comprises forming a channel within the swirl cup end plate joint during the electro-discharge machining process.

17. A method in accordance with claim 14 wherein forming a channel within the swirl cup end plate joint during the electro-discharge machining process further comprises contouring the channel during the electro-discharge machining process to substantially match a contour of the replacement deflector.

18. A method in accordance with claim 14 wherein coupling a replacement deflector plate into the swirl cup end plate joint further comprises using at least one of a welding process and a brazing process to couple the replacement deflector plate into the joint.

* * * * *